US012057262B2

(12) United States Patent
Suzuki et al.

(10) Patent No.: US 12,057,262 B2
(45) Date of Patent: Aug. 6, 2024

(54) EXTRUSION DIE FOR HOT-DEFORMED MAGNET AND METHOD FOR MANUFACTURING HOT-DEFORMED MAGNET USING SAME

(71) Applicant: TDK Corporation, Tokyo (JP)

(72) Inventors: Kenichi Suzuki, Tokyo (JP); Akihiro Ohsawa, Tokyo (JP)

(73) Assignee: TDK Corporation, Tokyo (JP)

( * ) Notice: Subject to any disclaimer, the term of this patent is extended or adjusted under 35 U.S.C. 154(b) by 88 days.

(21) Appl. No.: 17/554,950

(22) Filed: Dec. 17, 2021

(65) Prior Publication Data

US 2022/0199322 A1 Jun. 23, 2022

(30) Foreign Application Priority Data

Dec. 22, 2020 (JP) ................................. 2020-212651
Oct. 19, 2021 (JP) ................................. 2021-171026

(51) Int. Cl.
*B21C 25/02* (2006.01)
*B22F 3/20* (2006.01)
*H01F 41/02* (2006.01)

(52) U.S. Cl.
CPC ......... *H01F 41/0266* (2013.01); *B21C 25/02* (2013.01); *B22F 3/20* (2013.01); *B22F 2003/208* (2013.01)

(58) Field of Classification Search
CPC ....... B21C 23/001; B21C 25/02; B21C 23/04; B21C 23/06; H01F 41/0266
USPC ........................................................... 72/467
See application file for complete search history.

(56) References Cited

U.S. PATENT DOCUMENTS 2,225,424 A * 12/1940 Schwarzkopf .......... B21C 23/00 75/246
2,335,590 A * 11/1943 Gersman ................. B21C 25/02 72/417
2,671,559 A * 3/1954 Rosenkranz .............. C22F 1/04 72/364
3,070,841 A * 1/1963 Schornstheimer ...... B29C 48/08 264/108
3,178,935 A * 4/1965 Mcritchie ................. G01L 1/06 73/862.53
3,382,535 A * 5/1968 Ferrari .................... B29C 48/06 425/461
4,051,706 A * 10/1977 Sakamoto ................. H01F 1/04 148/120

(Continued)

FOREIGN PATENT DOCUMENTS

JP 2008-091867 A 4/2008
JP 2008-258585 A 10/2008

(Continued)

OTHER PUBLICATIONS

JP 10-97938A, Yamamoto et al. Apr. 1998.*

(Continued)

*Primary Examiner* — Edward T Tolan
(74) *Attorney, Agent, or Firm* — Faegre Drinker Biddle & Reath LLP

(57) ABSTRACT

Since the cross-sectional area of the plastic deforming portion of the extrusion die gradually decreases from the starting end portion toward the terminal end portion, the pressure applied to the molded body in hot deforming is not loosened, hence, the occurrence of cracks can be effectively suppressed.

3 Claims, 12 Drawing Sheets

(56) References Cited

U.S. PATENT DOCUMENTS

| | | | | | |
|---|---|---|---|---|---|
| 4,578,985 | A * | 4/1986 | Winter | B21C 37/0818 72/274 |
| 4,599,214 | A * | 7/1986 | Luton | B30B 11/221 419/13 |
| 4,862,728 | A * | 9/1989 | Hardouin | B21C 23/142 72/467 |
| 5,560,241 | A * | 10/1996 | Satoh | C30B 29/04 423/446 |
| 7,730,755 | B2 * | 6/2010 | Esaki | H01F 7/02 148/101 |
| 2008/0055031 | A1 | 3/2008 | Esaki et al. | |

FOREIGN PATENT DOCUMENTS

| | | | |
|---|---|---|---|
| JP | 2018-522400 | A | 8/2018 |
| WO | WO-2016/183824 | A1 | 11/2016 |

OTHER PUBLICATIONS

CN 107851506A, Yu et al. Mar. 2018.*
CN 105499292A, Qiao et al. Apr. 2016.*
JP 60-211909A, Miyata Oct. 1985.*
Reiner Kopp et al., "The introduction of Metal Plastic Forming," Higher Education Press, Mar. 2010, with partial English-language translation.

* cited by examiner

EXTRUSION DIE FOR HOT-DEFORMED MAGNET AND METHOD FOR MANUFACTURING HOT-DEFORMED MAGNET USING SAME

CROSS-REFERENCE TO RELATED APPLICATIONS

This application is based upon and claims the benefit of priority from Japanese Patent Applications No. 2020-212651, filed on 22 Dec. 2020 and No. 2021-171026, filed on 19 Oct. 2021, the entire contents of which are incorporated herein by reference.

TECHNICAL FIELD

The present disclosure relates to an extrusion die for a hot-deformed magnet and a method for manufacturing a hot-deformed magnet using the same.

BACKGROUND

Conventionally, an R-T-B based permanent magnet having excellent magnetic properties is known as a kind of permanent magnet, and is widely used. The R-T-B-based permanent magnets are roughly classified into two types. One is a sintered magnet produced by a powder metallurgy method, and the other is a hot-deformed magnet produced by a hot plastic deforming method.

Examples of the method for manufacturing the hot-deformed magnet include a die upset method, an upsetting forging method, a backward extrusion method, and a forward extrusion method. Among them, the forward extrusion method is suitable for manufacturing the hot-deformed magnet used for a high-efficiency motor such as an IPM. The properties of the hot-deformed magnet greatly respond to plastic deformation during hot deforming, and in the forward extrusion method, they can greatly respond to the shape of the extrusion die responsible for plastic deformation.

PATENT DOCUMENTS

Japanese Unexamined Patent Application No. 2008-258585
Japanese Unexamined Patent Application No. 2008-91867
Japanese Unexamined Patent Application No. 2018-522400

SUMMARY

In the method for manufacturing the hot-deformed magnet according to the related art, cracks generated in the hot-deformed magnet have not been studied, and the occurrence of cracks have not been sufficiently suppressed. In the case that cracks are generated in the hot-deformed magnet, the residual magnetic flux density Br may decrease as the main phase volume fraction decreases. In addition, the local demagnetizing field increases from the crack as a starting point, and magnetic reversal nuclei are likely to be generated. As a result, the coercivity $H_{cJ}$ may decrease. In view of the above, the present inventors have repeatedly studied cracks generated in the hot-deformed magnet, and have newly found a technique capable of suppressing the occurrence of cracks.

According to various aspects of the present disclosure, there are provided an extrusion die for a hot-deformed magnet capable of suppressing the occurrence of cracks in the hot-deformed magnet, and a method of manufacturing a hot-deformed magnet using the same.

An extrusion die for a hot-deformed magnet according to one aspect of the present disclosure having a starting end-face and a terminal end-face facing each other, and including a plastic deforming portion extending from the starting end-face to the terminal end-face. The plastic deforming portion has a cross-sectional area in a cross section orthogonal to a facing direction of the starting end-face and the terminal end-face gradually decreasing from a starting end portion at the starting end-face toward a terminal end portion at the terminal end-face of the plastic deforming portion.

In the above extrusion die, since the cross-sectional area of the plastic deforming portion gradually decreases from the starting end portion toward the terminal end portion, when the extrusion die is used for manufacturing a hot-deformed magnet, the pressure applied to a molded body during hot-deforming gradually increases. That is, the pressure applied to the molded body is not loosened in hot-deforming, hence, the occurrence of cracks due to loosening of the pressure is effectively suppressed.

In the extrusion die for the hot-deformed magnet according to another aspect, a ratio of a cross-sectional area of the terminal end portion to a cross-sectional area of the starting end portion of the plastic deforming portion is 60 to 90%. When the extrusion die is used for manufacturing the hot-deformed magnet, the hot-deformed magnet having high magnetic properties can be obtained. In addition, the occurrence of cracks is further suppressed, and thus the hot-deformed magnet having higher magnetic properties is obtained.

In the extrusion die for the hot-deformed magnet according to another aspect, the starting end portion of the plastic deforming portion has an end-face shape extending in one direction, and the terminal end portion of the plastic deforming portion also has an end-face shape extending in one direction.

In the extrusion die for the hot-deformed magnet according to another aspect, a first direction in which the end-face shape of the starting end portion of the plastic deforming portion extends and a second direction in which the end-face shape of the terminal end portion of the plastic deforming portion extends intersect with each other when viewed from a facing direction of the starting end-face and the terminal end-face of the extrusion die. In this case, large plastic deformation in the molded body can cause.

In the extrusion die for the hot-deformed magnet according to another embodiment, the end-face shape of the starting end portion and the end-face shape of the terminal end portion of the plastic deforming portion are rectangular.

In the extrusion die for the hot-deformed magnet according to another aspect, in the plastic deforming portion, from the end-face shape of the starting end portion to the end-face shape of the terminal end portion, the length of each side of the rectangle of the end-face shape changes exponentially. In this case, the cross-sectional area of the plastic deforming portion can be linearly reduced from the starting end portion at the starting end-face toward the terminal end portion at the terminal end-face of the plastic deforming portion. Therefore, the pressure applied to the molded body increases at a constant rate from the starting end portion toward the terminal end portion of the plastic deforming portion, hence, the occurrence of cracks can be further suppressed.

In the extrusion die for the hot-deformed magnet according to another aspect, the end-face shape of the terminal end portion of the plastic deforming portion is a partial annular shape.

A method for manufacturing a hot-deformed magnet according to one aspect of the present disclosure uses the above extrusion die and includes a step of hot-deforming a molded body obtained by molding magnetic powder with the extrusion die to obtain a hot-deformed magnet.

In the method for manufacturing the hot-deformed magnet, the pressure applied to the molded body is not loosened in the hot deforming step, hence, the occurrence of cracks due to loosening of the pressure is effectively suppressed.

DETAILED DESCRIPTION

Figure 1:
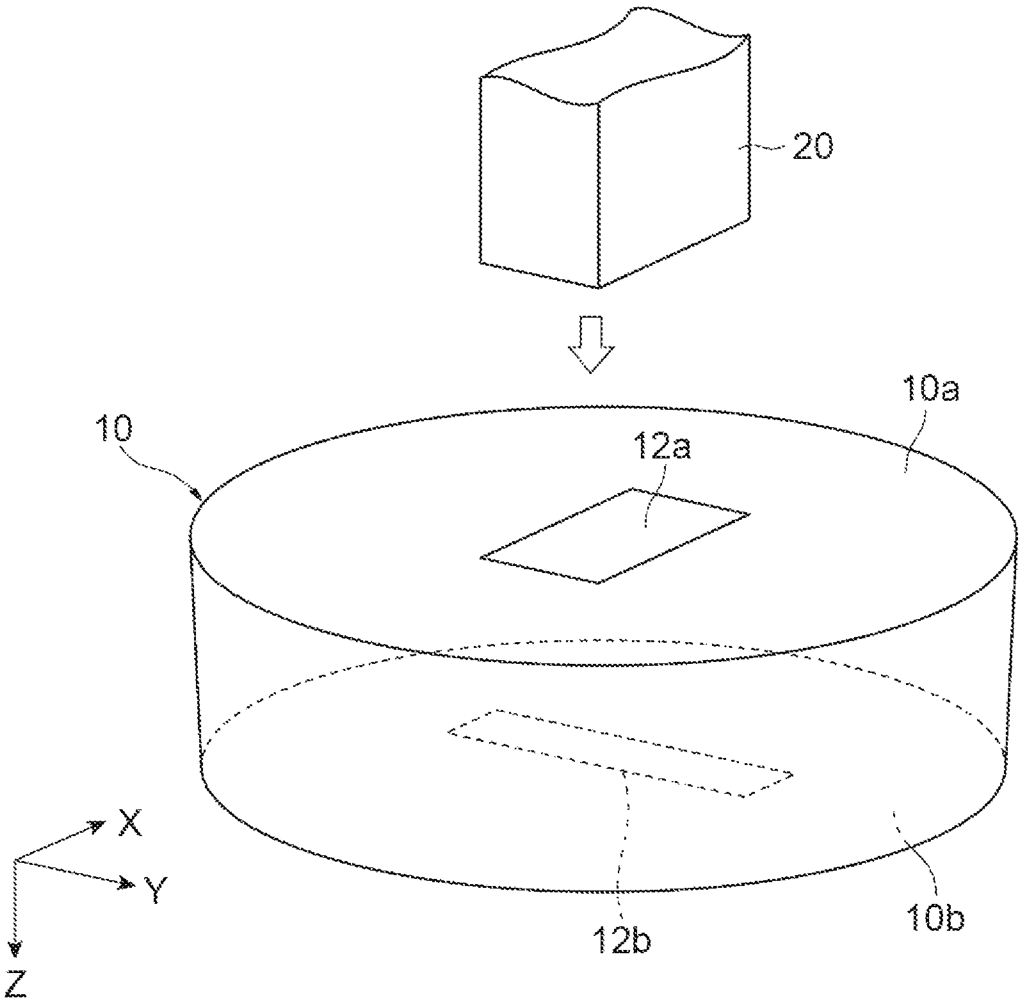
FIG. 1 is a schematic perspective view showing the extrusion die according to the first embodiment.

Hereinafter, embodiments of the present disclosure will be described in detail with reference to the accompanying drawings. In the following description, the same element or the element having the same function is denoted by the same reference numeral, and redundant description is omitted.

First Embodiment

A extrusion die 10 for a hot-deformed magnet according to the first embodiment will be described with reference to FIGS. 1, 2, 3A, and 3B. The extrusion die 10 has a starting end-face 10*a* and a terminal end-face 10*b* facing each other. In the present embodiment, the extrusion die 10 has a cylindrical outer shape, and both the starting end-face 10*a* and the terminal end-face 10*b* are circular. In the present embodiment, the starting end-face 10*a* and the terminal end-face 10*b* are parallel to each other. The extrusion die 10 is made of high heat-resistant material (for example, nickel-based superalloy (for example, Inconel (registered trademark)), molybdenum, or the like).

The extrusion die 10 includes a plastic deforming portion 12 extending from the starting end-face 10*a* to the terminal end-face 10*b*. The plastic deforming portion 12 has a starting end portion 12*a* at the starting end-face 10*a* and a terminal end portion 12*b* at the terminal end-face 10*b*.

The starting end portion 12*a* of the plastic deforming portion 12 has an end-face shape extending in one direction when viewed from a direction in which the starting end-face 10*a* and the terminal end-face 10*b* face each other. The end-face shape of the starting end portion 12*a* in the present embodiment is rectangular.

Hereinafter, for convenience of description, a direction in which the starting end-face 10*a* and the terminal end-face 10*b* face each other is referred to as a Z direction, a direction in which the end-face shape of the starting end portion 12*a* of the plastic deforming portion 12 extends is referred to as an X direction, and a direction orthogonal to the Z direction and the X direction is referred to as a Y direction.

In the extrusion die 10, the cross-sectional area in the X-Y cross-section of the plastic deforming portion 12 gradually decreases substantially linearly from the starting end portion 12*a* toward the terminal end portion 12*b*.

The terminal end portion 12*b* of the plastic deforming portion 12 has an end-face shape extending in one direction when viewed from a direction in which the starting end-face 10*a* and the terminal end-face 10*b* face each other. The end-face shape of the terminal end portion 12*b* in the present embodiment is rectangular. The end-face shape of the starting end portion 12*a* extends in the X direction (that is, the long side extends along the X axis), whereas the end-face shape of the terminal end portion 12*b* extends in the Y direction (that is, the long side extends along the Y axis). When viewed from the facing direction of the starting end-face 10*a* and the terminal end-face 10*b*, the X direction (first direction) in which the end-face shape of the starting end portion 12*a* extends and the Y direction (second direction) in which the end-face shape of the terminal end portion 12*b* extends intersect with each other, more specifically, are orthogonal to each other. In the plastic deforming portion 12, the long side (or the long axis) and the short side (or the short axis) are interchanged between the rectangular end-face of the starting end portion 12*a* and the rectangular end-face of the terminal end portion 12*b*. The end-face of the starting end portion 12*a* and the end-face of the terminal end portion 12*b* are in a relationship of skew lines.

As shown in FIG. 1, a molded body disposed on the starting end-face 10*a* of the extrusion die 10 is forwardly extruded toward the terminal end-face 10*b* in the Z direction by using a punch 20 having a cross-sectional shape of the same size as (or slightly shorter than) the end-face shape of the starting end portion 12*a* of the plastic deforming portion 12. As a result, a strip-shaped hot-deformed magnet is obtained, which has the same cross-sectional shape as the end-face shape of the terminal end portion 12*b* of the plastic deforming portion 12. The strip-shaped hot-deformed magnet is cut to a predetermined width as needed.

Figure 2:
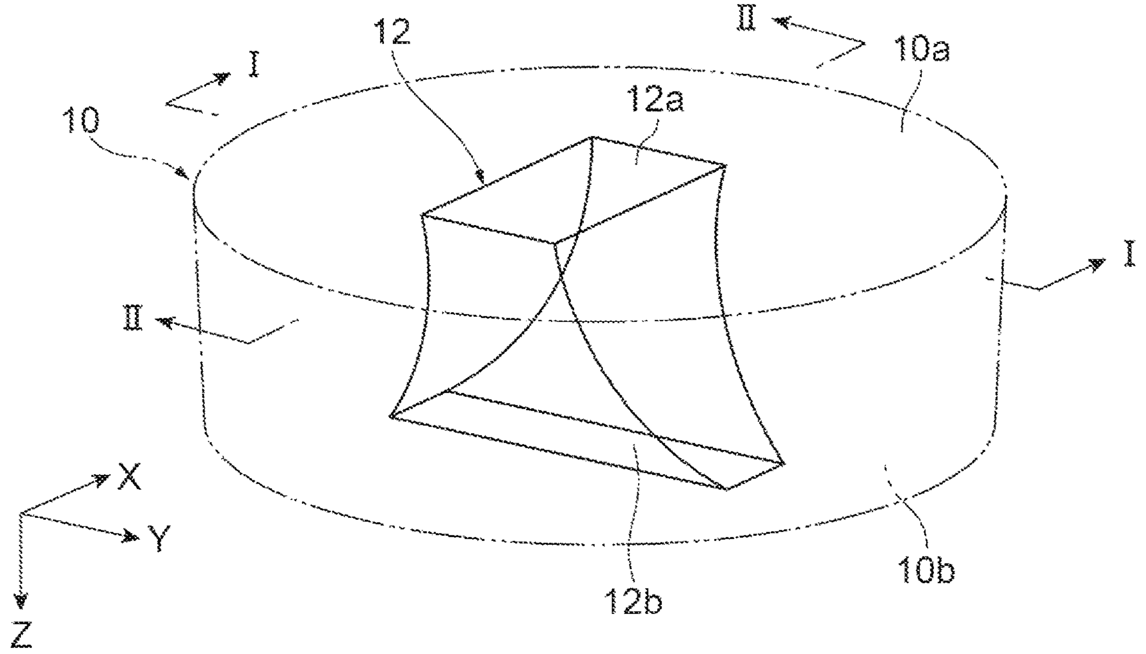
FIG. 2 is a view showing the plastic deforming portion of the extrusion die shown in FIG. 1.
Figure 3A:
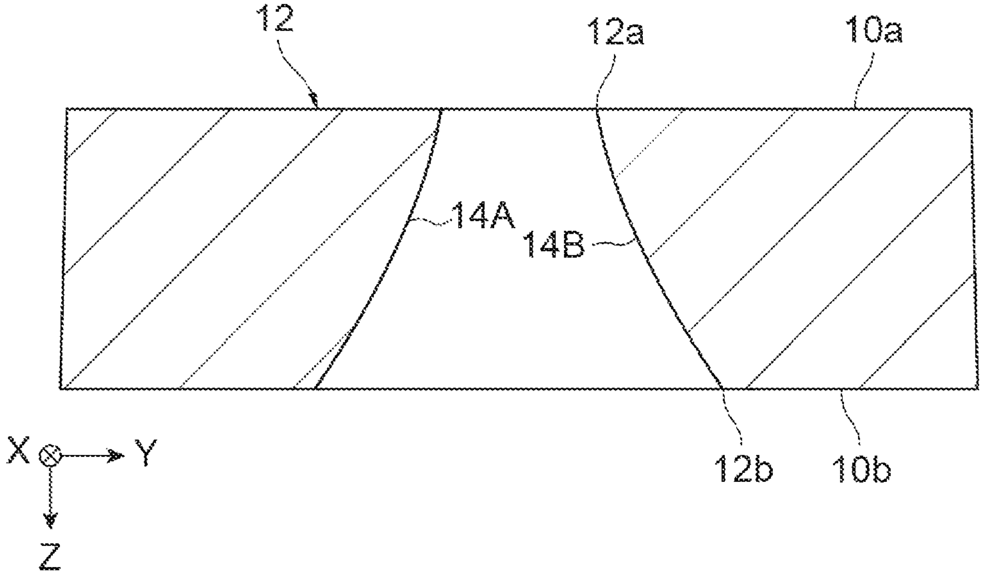
FIGS. 3A and 3B are schematic sectional views of the plastic deforming portion of the extrusion die shown in FIG. 1.
Figure 3B:
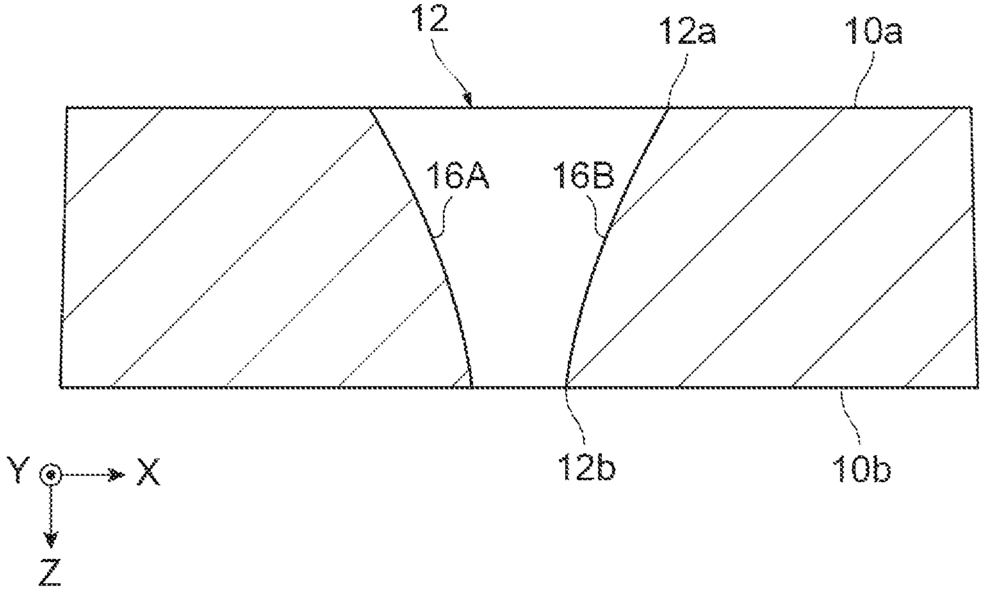
Figure 4:
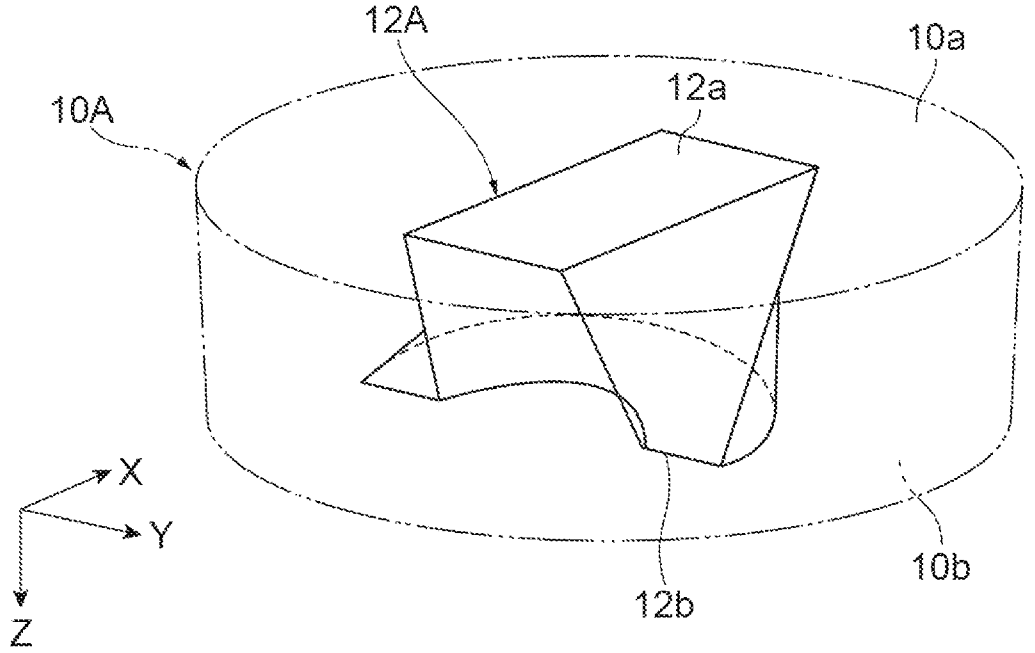
FIG. 4 is a schematic perspective view showing the extrusion die according to the second embodiment.

Inside the extrusion die 10, the contour of the plastic deforming portion 12 is formed by a curve as shown in FIGS. 2, 3A, and 3B.

In the Y-Z cross section shown in FIG. 3A (cross section taken along line I-I in FIG. 2), the width of the starting end portion 12*a* of the plastic deforming portion 12 (i.e., the short side length of the rectangular end-face) gradually increases exponentially toward the terminal end portion 12*b*, and coincides with the width of the terminal end portion 12*b* at the terminal end-face 10*b* (i.e., the long side length of the rectangular end-face). That is, both the contour lines 14A and 14B of the plastic deforming portion 12 in the Y-Z cross section are curve lines that can be expressed by exponential functions.

In the X-Z cross section shown in FIG. 3B (the cross section taken along line II-II in FIG. 2), the width of the starting end portion 12*a* of the plastic deforming portion 12 (i.e., the length of the long side of the rectangular end-face) gradually decreases exponentially toward the terminal end portion 12*b*, and coincides with the width of the terminal end portion 12*b* at the terminal end-face 10*b* (i.e., the length of the short side of the rectangular end-face). That is, both the contour lines 16A and 16B of the plastic deforming portion 12 in the X-Z cross section are curve lines that can be expressed by exponential functions.

In the hot-deformed magnet, when a crack is generated in a portion, the magnetization in the portion is reduced, and the magnetization per unit volume decreases. As a result, the residual magnetic flux density decreases. By using the extrusion die for manufacturing a hot-deformed magnet, the occurrence of cracks in the hot-deformed magnet can be suppressed, and thus a decrease in residual magnetic flux density can be suppressed.

In addition, a demagnetizing field is generated in a portion in which a crack is generated in the hot-deformed magnet, similarly to the magnet surface, and the demagnetizing field becomes a starting point of magnetization reversal. As the number of cracks in the hot-deformed magnet increases, the number of starting points of magnetization reversal increases, so that the coercivity of the hot-deformed magnet decreases. According to the above method for manufacturing a hot-deformed magnet, the occurrence of cracks that are starting points of magnetization reversal can be suppressed, and thus a decrease in coercivity can be suppressed.

By setting the ratio (area reduction ratio) of the area of the terminal end portion 12*b* to the area of the starting end portion 12*a* of the plastic deforming portion 12 to 60 to 90% (for example, 86.8%), the hot-deformed magnet having high magnetic properties (for example, coercivity) can be obtained. In addition, the occurrence of cracks is further suppressed, whereby the hot-deformed magnet having high magnetic properties (for example, residual magnetic flux density Br and coercivity $H_{cJ}$) can be obtained.

In addition, the end-face of the starting end portion 12*a* and the end-face of the terminal end portion 12*b* of the plastic deforming portion 12 may not be in a relationship of skew lines but may be in a parallel positional relationship (for example, both extend in the X direction). When the end-face of the starting end portion 12*a* and the end-face of the terminal end portion 12*b* of the plastic deforming portion 12 are in a relationship of skew lines, a relatively large plastic deformation can be generated when the molded body passes through the plastic deforming portion 12, and the hot-deformed magnet having high magnetic properties (for example, coercivity) can be obtained.

Further, when the length of each side of the rectangle of the end-face shape changes exponentially from the end-face shape of the starting end portion 12*a* toward the end-face shape of the terminal end portion 12*b* of the plastic deforming portion 12, the cross-sectional area of the plastic deforming portion 12 can be linearly reduced from the starting end portion 12*a* at the starting end-face 10*a* to the terminal end portion 12*b* at the terminal end-face 10*b* of the plastic deforming portion 12. Therefore, the pressure applied to the molded body increases at a constant rate from the starting end portion 12*a* toward the terminal end portion 12*b* of the plastic deforming portion 12, hence, the occurrence of cracks can be further suppressed.

Second Embodiment

An extrusion die 10A for the hot-deformed magnet according to a second embodiment will be described with reference to FIGS. 4, 5A, 5B, 6, and 7. The extrusion die 10A is different from the extrusion die 10 according to the first embodiment in the shape of the plastic deforming portion 12A, and is the same as or similar to the extrusion die 10 in other respects.

Figure 5A:
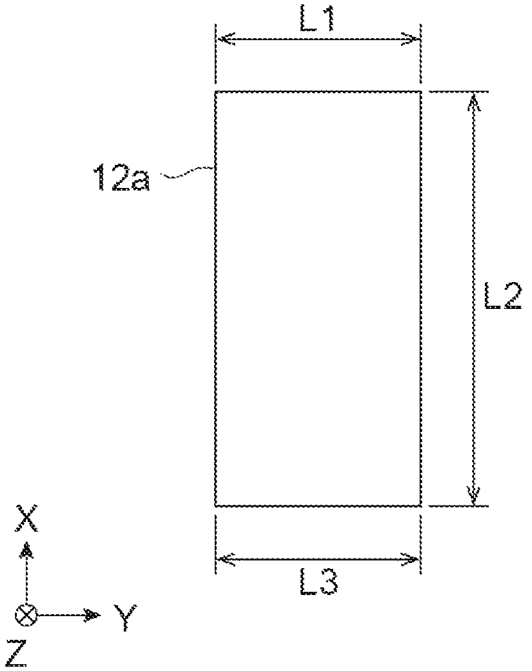
FIG. 5A is a view showing the shape of the starting end portion and FIG. 5B is a view showing the shape of the terminal end portion of the plastic deforming portion of the extrusion die shown in FIG. 4.

The starting end portion 12*a* of the plastic deforming portion 12A has an end-face shape extending in one direction, and more specifically, has a rectangular end-face shape, when viewed from the direction in which the starting end-face 10*a* and the terminal end-face 10*b* of the extrusion die 10A face each other. As shown in FIG. 5A, the starting end portion 12*a* of the plastic deforming portion 12A has one short side L1, a long side L2, and the other short side L3. In the starting end portion 12*a* of the plastic deforming portion 12A, the short side lengths L1 and L3 are the same, and are 1.0 mm as an example. In the starting end portion 12*a* of the plastic deforming portion 12A, the long side L2 is, for example, 2.0 mm.

Figure 5B:
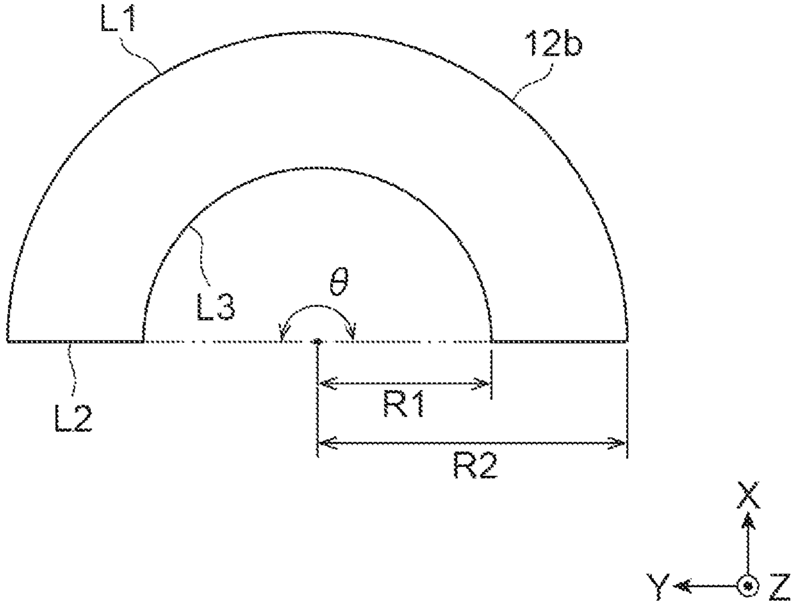

The terminal end portion 12*b* of the plastic deforming portion 12A has a partially annular end-face shape when viewed from the facing direction of the starting end-face 10*a* and the terminal end-face 10*b* of the extrusion die 10A. More specifically, the partial annular shape of the end-face shape of the terminal end portion 12*b* is a semi-annular shape in which the opening angle θ of the inner arc is 180 degrees. As shown in FIG. 5B, the terminal end portion 12*b* of the plastic deforming portion 12A has an outer arc length L1, an edge length L2, and an inner arc length L3. The curvature radius R1 of the inner arc is, for example, 0.65 mm, and the inner arc length L3 (=R1×π) in this case is about 2.0 mm. The curvature radius R2 of the outer arc is, for example, 1.15 mm, and the outer arc length L1 (=R2×π) in this case is about 3.6 mm. The edge length L2 (=R2−R1) is, for example, 0.5 mm.

In the plastic deforming portion 12A, the shape and size of the contour gradually change between the rectangular end-face of the starting end portion 12*a* and the semicircular end-face of the terminal end portion 12*b*. More specifically, one short side (length L1) of the starting end portion 12*a* gradually changes to the outer arc of the terminal end portion 12*b*, the pair of long sides of the starting end portion 12*a* gradually changes to the pair of edges of the terminal end portion 12*b*, and the other short side (length L3) of the starting end portion 12*a* gradually changes to the inner arc of the terminal end portion 12*b*.

Figure 6:
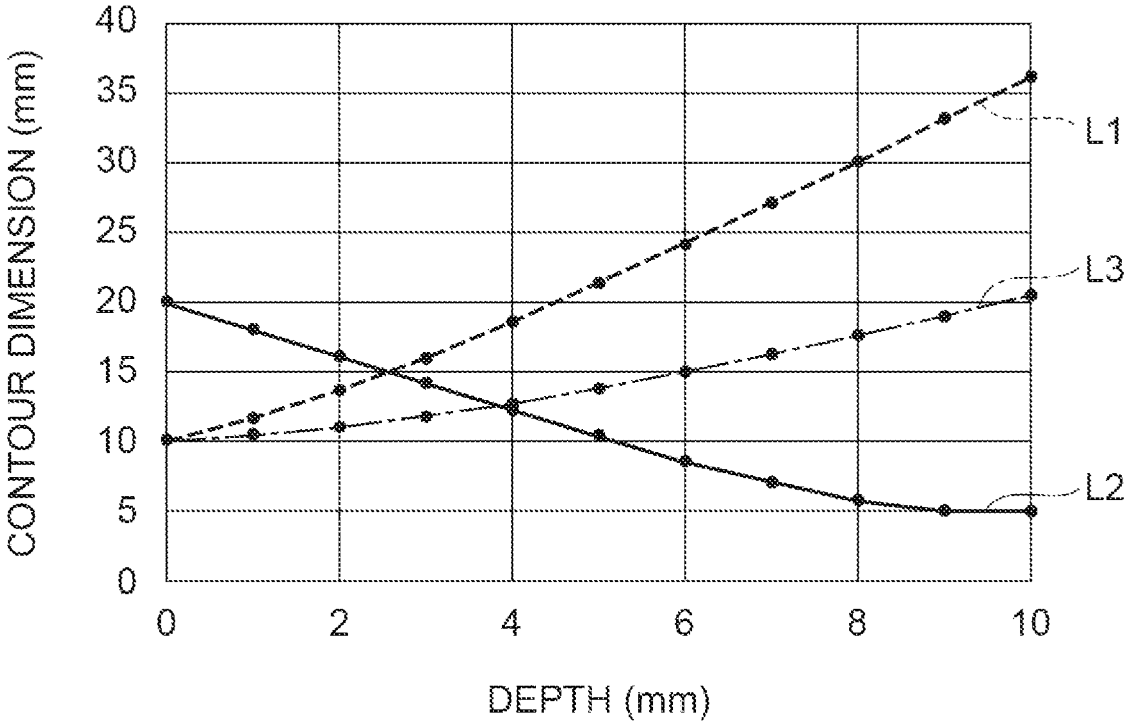
FIG. 6 is a graph showing a change in the contour dimension of the plastic deforming portion of the extrusion die shown in FIG. 4.

FIG. 6 is a graph showing changes in the contour dimensions L1, L2, and L3 of the plastic deforming portion 12A, in which the vertical axis represents the contour dimension (mm) and the horizontal axis represents the distance (depth) from the starting end-face 10*a*. As shown in the graph of FIG. 6, the contour dimensions L1 and L3 monotonously increase from the starting end portion 12*a* to the terminal end portion 12*b*, and the contour dimension L2 monotonously decreases from the starting end portion 12*a* to the terminal end portion 12*b*.

Figure 7:
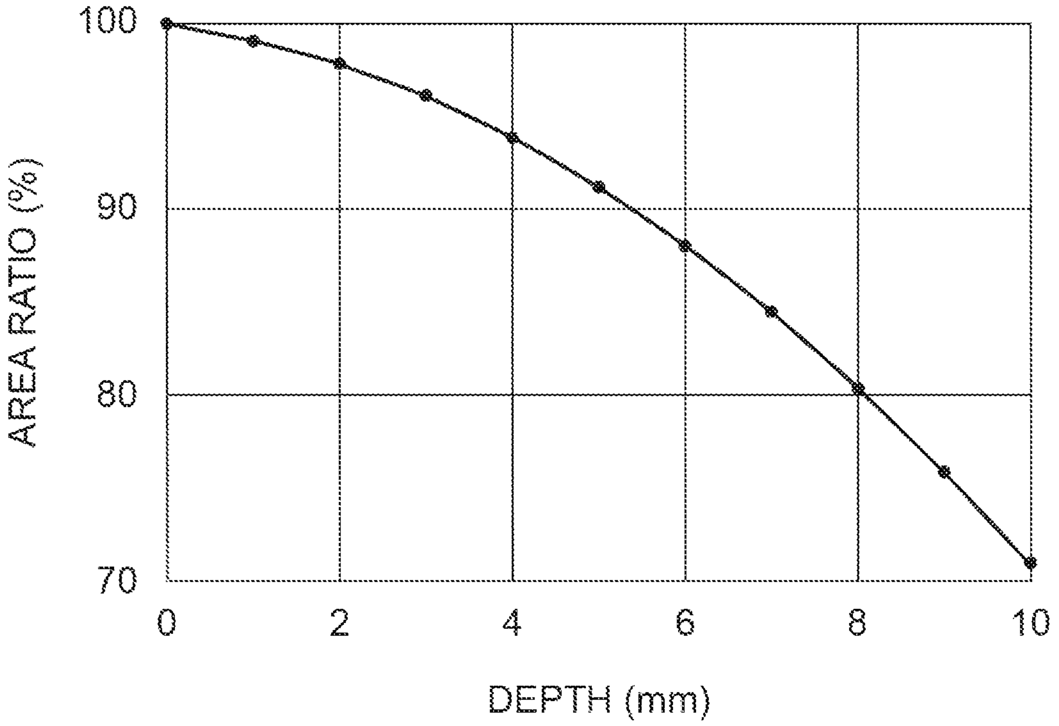
FIG. 7 is a graph showing a change in the cross-sectional area of the plastic deforming portion of the extrusion die shown in FIG. 4.

FIG. 7 is a graph showing a change in the cross-sectional area of the plastic deforming portion 12A, in which the vertical axis represents the area ratio when the area of the starting end portion 12*a* is 100%, and the horizontal axis represents the distance (depth) from the starting end-face 10*a*. As shown in the graph of FIG. 7, the cross-sectional area of the plastic deforming portion 12A gradually decreases from the starting end portion 12*a* toward the terminal end portion 12*b*.

As described above, in the extrusion die 10A, similarly to the above extrusion die 10, since the cross-sectional area of the plastic deforming portion 12A gradually decreases from the starting end portion 12*a* toward the terminal end portion 12*b*, the pressure applied to the molded body during hot deforming is not loosened, hence, the occurrence of cracks can be effectively suppressed.

In the extrusion die 10A, the end-face shape of the terminal end portion 12*b* of the plastic deforming portion 12A is a partial annular shape (that is, a semi-annular shape) in which the opening angle θ of the inner arc is 180 degrees, but may be a partial annular shape in which the opening angle θ is smaller than 180 degrees. The opening angle θ may be 120 degrees or less, or may be 90 degrees or less.

Although the embodiments of the present disclosure have been described above, the present disclosure is not necessarily limited to the above-described embodiments, and various modifications can be made without departing from the gist thereof.

For example, the end-face shape of the starting end portion and the terminal end portion of the plastic deforming portion is not limited to a rectangular shape, and may be an elliptical shape extending in one direction, or may be a perfect circle shape, a U shape, or a V shape.

(Method for Manufacturing Hot-Deformed Magnet)

Figure 8:
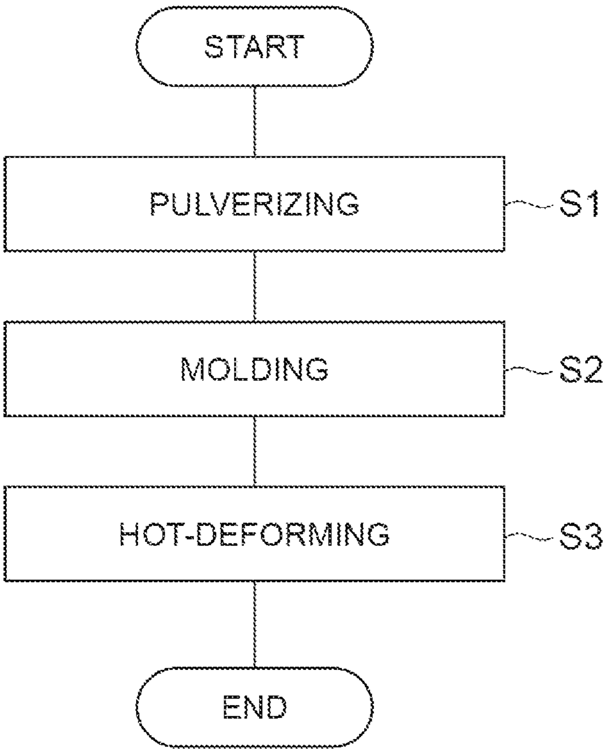
FIG. 8 is a flowchart showing the method of manufacturing the hot-deformed magnet.

A method for manufacturing a hot-deformed magnet using the above extrusion dies 10 and 10A will be described with reference to the flowchart shown in FIG. 8. A method for manufacturing a neodymium magnet (neodymium-iron-boron-based magnet) having an $R_2T_{14}B$ crystal will be described below, which is a kind of R-T-B-based permanent magnets, as a main phase.

In the R-T-B based permanent magnet, R represents a rare earth element. The permanent magnet contains at least neodymium (Nd) as a rare earth element. The permanent magnet may contain other rare earth elements in addition to Nd. The other rare earth element may be at least one selected from the group consisting of scandium (Sc), yttrium (Y), lanthanum (La), cerium (Ce), praseodymium (Pr), samarium (Sin), europium (Eu), gadolinium (Gd), terbium (Tb), dysprosium (Dy), holmium (Ho), erbium (Er), thulium (Tin), ytterbium (Yb), and lutetium (Lu). In the R-T-B based permanent magnet, T represents a transition metal element. The permanent magnet contains at least iron (Fe) as a transition metal element. The permanent magnet may contain only Fe as a transition metal element. The permanent magnet may contain both Fe and cobalt (Co) as transition metal elements. In the R-T-B based permanent magnet, B is boron.

When manufacturing a hot-deformed magnet, first, a magnet material as a raw material is pulverized into magnetic powder (step S1). The pulverization can be performed by, for example, a cutter mill or a propeller mill, and can be performed in, for example, an argon gas atmosphere (or a nitrogen gas atmosphere). The particle diameter of the magnetic powder obtained by pulverization is, for example, about 100 to 300 μm. The magnetic powder is not finely pulverized to the size level of neodymium magnet crystals (1 μm or less, for example, several 10 to several 100 nm), and has a polycrystalline structure composed of a plurality of neodymium magnet crystals.

The magnetic powder obtained in step S1 is molded by a compression molding machine to obtain a molded body (step S2). The molding is performed in a nitrogen gas atmosphere (or an argon gas atmosphere) at a high temperature of 800° C. or less (for example, 750° C.) and a pressure of 200 MPa or less for several 10 seconds. By molding, a dense molded body is obtained. However, in the state of this molded body, the magnet particles are randomly oriented, and the easy magnetization axis directions are not aligned.

The molded body obtained in step S2 is hot-deformed by a forward extrusion method to obtain a hot-deformed magnet (step S3). The hot deforming is performed in a nitrogen gas atmosphere (or in an argon gas atmosphere or in the air) at a high temperature of 800° C. or less (for example, 750° C.) and a pressure of 100 MPa or less for several 10 seconds. The above extrusion dies 10 and 10A can be used for this hot deforming.

EXAMPLES

Here, experiments conducted by the inventors on the cross-sectional areas of the plastic deforming portions 12 and 12A of the extrusion dies 10 and 10A will be described.

Figure 9:
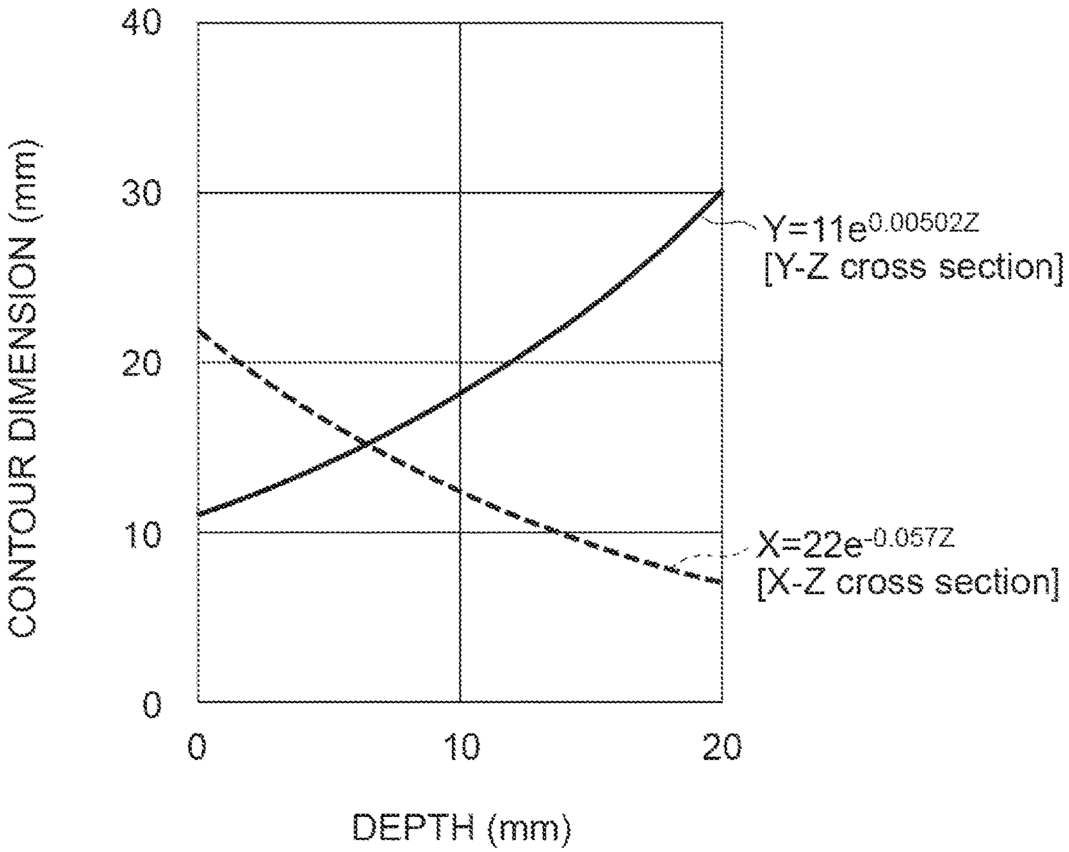
FIG. 9 is a graph showing a change in the contour dimension of Sample 1 according to the example.
Figure 10:
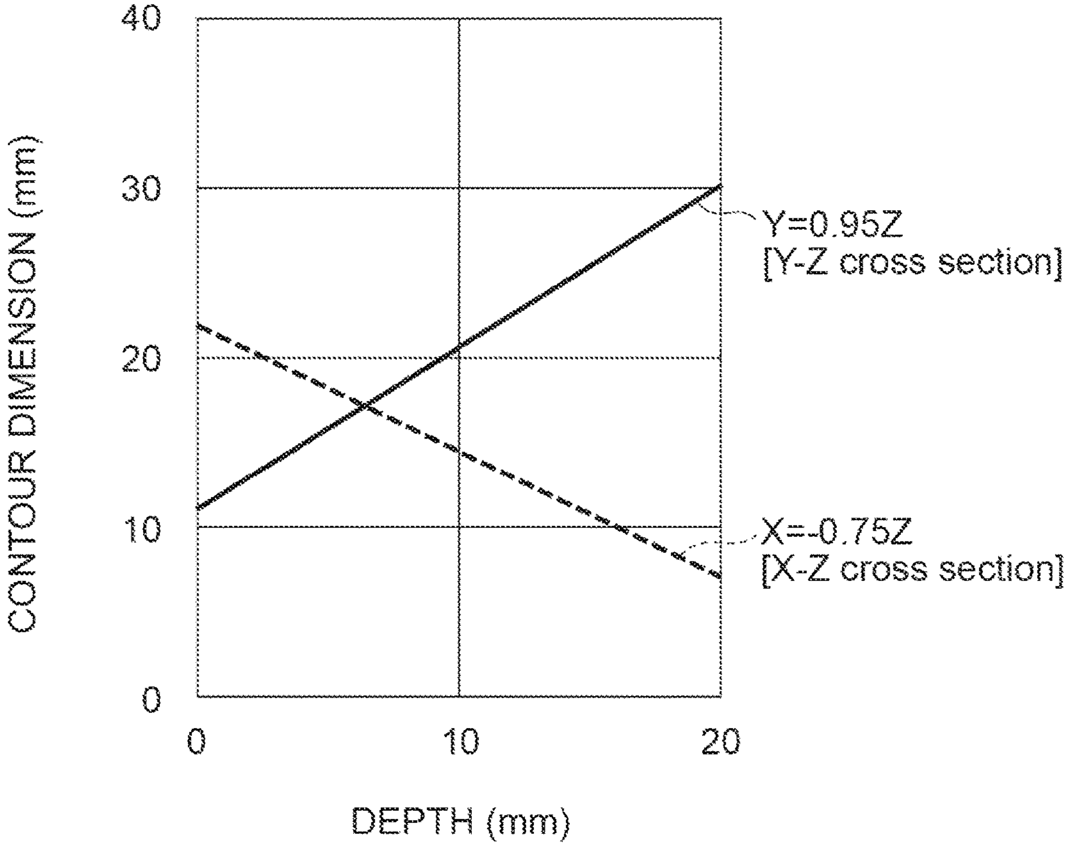
FIG. 10 is a graph showing a change in the contour dimension of Sample 2 according to the example.

As Samples 1 and 2, extrusion dies were prepared in which the rectangular end-face of the starting end portion of the plastic deforming portion was 11 mm×22 mm, the rectangular end-face of the terminal end portion in which the long side and the short side were reversed was 30 mm×7 mm, and the thickness was 20 mm, as in the above extrusion die 10. In Sample 1, as shown in FIG. 9, the contour dimensions (X-direction length and Y-direction length) of the plastic deforming portion were changed exponentially. In Sample 2, as shown in FIG. 10, the contour dimensions of the plastic deforming portion were changed linearly. In the graphs of FIGS. 9 and 10, the vertical axis represents the contour dimension, and the horizontal axis represents the distance (depth) from the starting end-face.

Figure 11:
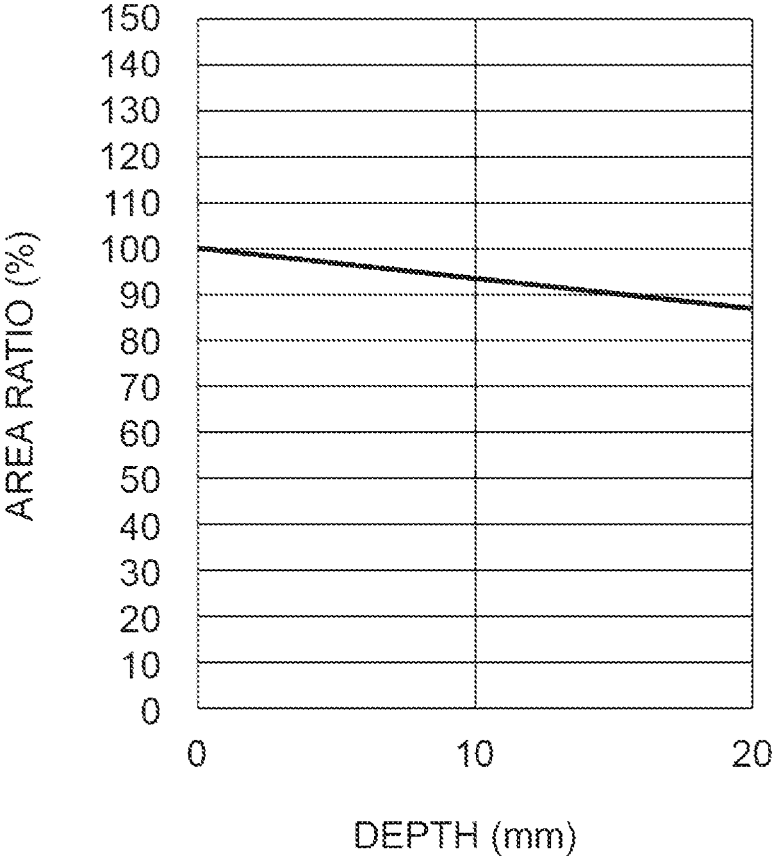
FIG. 11 is a graph showing a change in the cross-sectional area of Sample 1 according to the example.
Figure 12:
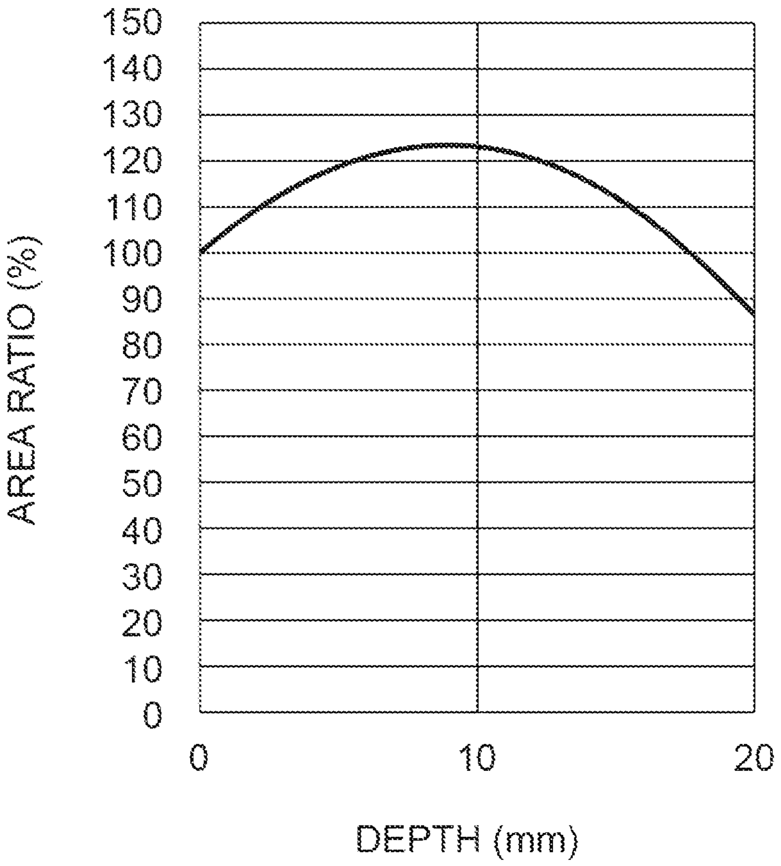
FIG. 12 is a graph showing a change in the cross-sectional area of Sample 2 according to the example.

In Sample 1, as shown in FIG. 11, the cross-sectional area of the plastic deforming portion gradually decreases substantially linearly from the starting end portion toward the terminal end portion. On the other hand, in Sample 2, as shown in FIG. 12, the cross-sectional area of the plastic deforming portion once gradually increases from the starting end portion toward the terminal end portion, reaches the maximum cross-sectional area in the vicinity of the middle between the starting end portion and the terminal end portion, and then gradually decreases. In the graphs of FIGS. 11 and 12, the vertical axis represents the area ratio when the area of the starting end portion is 100%, and the horizontal axis represents the distance (depth) from the starting end-face. In the graph of FIG. 11, the ratio of the area of the terminal end portion to the area of the starting end portion of the plastic deforming portion is 86.8%.

Then, hot deforming of the molded body was performed using Sample 1 and Sample 2 to obtain a hot-deformed magnet. As a result, no crack was observed in the hot-deformed magnet obtained using Sample 1, but cracks were observed in the hot-deformed magnet obtained using Sample 2.

As Sample 3, an extrusion die having a rectangular end-face of 20 mm×10 mm at the starting end portion of the plastic deforming portion and a semi-annular end-face of 13 mm in inner diameter, 5 mm thick, and an opening angle of 180 degrees of the inner arc at the terminal end portion was prepared as in the extrusion die 10A described above. In Sample 3, as shown in FIG. 6, the contour dimension of the plastic deforming portion was changed. In the graph of FIG. 6, the vertical axis represents the contour dimension, and the horizontal axis represents the distance (depth) from the starting end-face.

In Sample 3, as shown in FIG. 7, the cross-sectional area of the plastic deforming portion gradually decreases from the starting end portion toward the terminal end portion. In the graph of FIG. 7, the vertical axis represents the area ratio when the area of the starting end portion is 100%, and the horizontal axis represents the distance (depth) from the starting end-face. In the graph of FIG. 7, the ration of the area of the terminal end portion to the area of the starting end portion of the plastic deforming portion is 70.6%.

Then, hot deforming of the molded body was performed using Sample 3 to obtain a hot-deformed magnet. As a result, no crack was observed in the hot-deformed magnet obtained using Sample 3.

This is considered to be because when the cross-sectional area of the plastic deforming portion gradually decreases from the starting end portion toward the terminal end portion without increasing at all as in Samples 1 and 3, the pressure applied to the molded body is gradually increased during hot deforming, and therefore the pressure is not loosened during hot deforming, but when the cross-sectional area of the plastic deforming portion increases even slightly as in Sample 2, the pressure is loosened to cause cracks.

What is claimed is:

1. An extrusion die for a hot-deformed magnet, the extrusion die having a starting end-face and a terminal end-face facing each other, and including a plastic deforming portion extending from the starting end-face to the terminal end-face, wherein the plastic deforming portion has a cross-sectional area in a cross section orthogonal to a facing direction of the starting end-face and the terminal end-face gradually decreasing without increasing as a depth from a starting end portion at the starting end-face toward a terminal end portion at the terminal end-face of the plastic deforming portion increases, wherein the starting end portion of the plastic deforming portion has an end-face shape extending in one direction, and the terminal end portion of the plastic deforming portion also has an end-face shape extending in one direction, wherein a first direction in which the end-face shape of the starting end portion of the plastic deforming portion extends and a second direction in which the end-face shape of the terminal end portion of the plastic deforming portion extends intersect with each other when viewed from a facing direction of the starting end-face and the terminal end-face of the extrusion die, wherein the end-face shape of the starting end portion and the end-face shape of the terminal end portion of the plastic deforming portion are rectangular, and wherein in the plastic deforming portion, from the end-face shape of the starting end portion to the end-face shape of the terminal end portion, the length of each side of the rectangle of the end-face shape changes exponentially.

2. The extrusion die for the hot-deformed magnet according to claim 1, wherein a ratio of a cross-sectional area of the terminal end portion to a cross-sectional area of the starting end portion of the plastic deforming portion is 60 to 90%.

3. A method for manufacturing a hot-deformed magnet using the extrusion die according to claim 1, the method comprising a step of hot-deforming a molded body obtained by molding magnetic powder with the extrusion die to obtain a hot-deformed magnet.

* * * * *